United States Patent [19]

Khemani et al.

[11] Patent Number: 5,654,347

[45] Date of Patent: Aug. 5, 1997

[54] CONCENTRATES FOR IMPROVING POLYESTER COMPOSITIONS AND METHOD OF MAKING SAME

[75] Inventors: Kishan C. Khemani, Johnson City; James W. Mercer, Jr.; Richard L. McConnell, both of Kingsport, all of Tenn.

[73] Assignee: Eastman Chemical Company, Kingsport, Tenn.

[21] Appl. No.: 494,197

[22] Filed: Jun. 23, 1995

Related U.S. Application Data

[63] Continuation of Ser. No. 130,816, Oct. 4, 1993, abandoned.

[51] Int. Cl.$^6$ .................................................. C08L 67/02
[52] U.S. Cl. .............. 521/138; 521/81; 524/413; 524/427; 524/437; 524/445; 524/451; 524/513
[58] Field of Search ........................ 527/177; 525/177; 521/138; 524/413, 427, 437, 445, 451, 513

[56] References Cited

U.S. PATENT DOCUMENTS

| | | | |
|---|---|---|---|
| 3,205,185 | 9/1965 | Lessells | 524/321 |
| 3,620,878 | 11/1971 | Guthrie | 524/321 |
| 3,960,807 | 6/1976 | McTaggart | 260/40 R |
| 4,132,707 | 1/1979 | Borman | 528/273 |
| 4,145,466 | 3/1979 | Leslie et al. | 428/35 |
| 4,291,131 | 9/1981 | McIntire | 525/5 |
| 4,572,852 | 2/1986 | Gartland et al. | 428/35 |
| 4,981,631 | 1/1991 | Cheung et al. | 264/50 |
| 4,999,388 | 3/1991 | Okamoto | 523/400 |
| 5,000,991 | 3/1991 | Hayashi et al. | 428/36.5 |
| 5,110,844 | 5/1992 | Hayashi et al. | 521/182 |
| 5,128,383 | 7/1992 | Amano et al. | 521/182 |
| 5,134,028 | 7/1992 | Hayashi et al. | 428/332 |
| 5,229,432 | 7/1993 | Muschiatti | 521/182 |

FOREIGN PATENT DOCUMENTS

| | | | |
|---|---|---|---|
| 904798 | 8/1962 | United Kingdom | 524/321 |

OTHER PUBLICATIONS

Derwent Abstract JP51114447, (Asahi Chemical Ind. KK.) Oct. 9, 1976.

*Primary Examiner*—Patricia A. Short
*Attorney, Agent, or Firm*—Betty J. Boshears; Harry J. Gwinnell

[57] ABSTRACT

Disclosed is a concentrate useful as an additive in a polyester composition comprising a polyolefin and a polyfunctional carboxylic acid or polyol branching agent. Also disclosed is a method of preparing a polyester composition having increased melt viscosity and melt strength, and improved impact strength which comprises the steps of A) melt compounding a polyolefin and a polyfunctional carboxylic acid or polyol branching agent, B) dry blending the melt compounded mixture formed in A) with a polyester, and C) molding or extruding the dry blended mixture formed into B) to form an article.

15 Claims, No Drawings ical or cycloaliphatic glycol having
CONCENTRATES FOR IMPROVING POLYESTER COMPOSITIONS AND METHOD OF MAKING SAME This is a continuation of application Ser. No. 08/130,816 filed on Oct. 4, 1993, now abandoned.

TECHNICAL FIELD

The present invention relates to improved polyester compositions prepared from a concentration containing a branching agent and a polyolefin, and to the method for preparing the improved polyester compositions. These compositions have improved melt viscosity, melt strength and impact strength, and are particularly useful in preparing foamed articles although they are also useful in non-foamed polyester compositions.

BACKGROUND OF THE INVENTION

Many polymeric materials are foamed to provide low density articles such as films, cups, food trays, decorative ribbons, and furniture parts. For example, polystyrene beads containing low boiling hydrocarbons such as pentane are formed into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of these blowing agents to form lightweight furniture parts such as table legs and to form lightweight chairs.

Polyesters such as poly(ethylene terephthalate) have a much higher density (e.g. about 1.3 g/cc) than other polymers. Therefore, it would be desirable to be able to foam polyester materials to decrease the weight of molded parts, films, sheets, food trays, and the like. Such foamed articles also have better insulating properties than unfoamed parts. However, it is difficult to foam such polyester materials because of the low melt viscosity and low melt strength of typical poly(ethylene terephthalate) and related polyester polymers. The low melt viscosity and low melt strength of the polyesters is a problem because the polymer melt will not adequately retain the bubbles of an expanding gas. It would be desirable therefore to be able to provide polyester polymers which could be foamed with conventional foaming systems.

One approach to provide polyesters with high melt strength involves treating preformed polyesters with multifunctional carboxylic acids or polyols to provide branched polyesters. Such compositions are disclosed in U.S. Pat. Nos. 4,132,707; 4,145,466; 4,999,388; 5,000,991; 5,110,844; 5,128,383; and 5,134,028. The branching agents used include tri- and tetracarboxylic acids and anhydrides such as trimesic acid, pyromellitic acid, and pyromellitic dianhydride or polyols such as trimethylolpropane and pentaerythritol. These branching agents will provide polyesters with increased melt viscosities and melt strengths but their use is often disadvantageous. For one thing, the branching agent cannot be put into the initial reaction mixture of polyester reagents because this will lead to crosslinked structures. If added after the polyester is formed, an additional processing step is required and the branching action is hard to control. The usual method of adding the branching agent is to melt the polyester in an extruder and to add the branching agent into the melt in the barrel of the extruder. It is difficult to control the amount of branching agent used and to get adequate mixing and reaction before the melt exits the die.

It would be advantageous therefore to provide a method whereby the branching agent and possibly other additives could be dry blended with the polyester pellets prior to the extrusion operation.

Other patent references of interest with regard to foaming polymers include U.S. Pat. Nos. 3,879,505; 4,149,485; 4,176,101; 4,761,256; 4,284,596; 4,351,911; 4,462,947; 4,466,933; 4,473,665; 4,626,183; 4,728,673; 4,734,304; 4,737,523; 4,746,478; 4,751,250; 4,981,631; and 5,182,307.

The closest prior art of which we are aware concerning polyester/polyolefin blends include U.S. Pat. Nos. 4,981, 631, 3,960,807, 4,572,852 and 5,229,432 but none of these patents are related to a master batch concept for incorporating some other agents into a polyester composition.

It has now been found that branching agents such as trimellitic acid, pyromellitic dianhydride and the like can be melt compounded with polyolefin polymers to provide concentrates. These concentrates can be dry blended with polyesters such as poly(ethylene terephthalate), dried in vacuum or conventional ovens, and then extruded and foamed with conventional inert gases, volatile organic compounds, or chemical blowing agents. During the melt compounding, the branching agent reacts with the polyester to provide branching and thus to increase the melt viscosity and the melt strength of the polyester. The effect of this is to significantly improve the foamability and blow molding characteristics of the polyester. The polyolefin of the concentrate component is also beneficial for improving the impact properties of the polyester.

DESCRIPTION OF THE INVENTION

According to one embodiment of the present invention, there is provided a concentrate useful as an additive in a polyester composition comprising A) about 50 to about 99 wt % of a polyolefin selected from (1) ethylene polymers having a melt index of about 0 to about 100 at 190° C. and (2) propylene polymers, 1-butene polymers, and copolymers of propylene and/ or 1-butene, having a melt flow rate of about 0 to about 100 at 230° C., and B) about 1 to about 50 wt % of a polyfunctional carboxylic acid or polyol branching agent having at least 3 carboxylic or hydroxyl groups or combinations thereof.

According to another embodiment of the present invention there is provided a method of preparing a polyester composition having increased melt viscosity and melt strength, and improved impact strength which comprises the steps of A) melt compounding
  1) about 50 to about 99 wt % of a polyolefin selected from (1) ethylene polymers having a melt index of about 0 to about 100 at 190° C. and (2) propylene polymers, 1-butene polymers, and copolymers of propylene and/or 1-butene, having a melt flow rate of about 0 to about 100 to 230° C., and
  2) about 1 to about 50 wt % of a polyfunctional carboxylic acid or polyol branching agent having at least 3 carboxylic or hydroxyl groups or combinations thereof to form a melt compounded concentrate, B) dry blending the melt compounded mixture formed in A) with about 80 to about 99.9 wt % of a polyester having repeat units from an aromatic, aliphatic or cycloaliphatic dicarboxylic acid having 6–40 carbon atoms and an aliphatic or cycloaliphatic glycol having 2–10 carbon atoms, said polyester having an I.V. of about 0.4–1.1, and C) molding or extruding the dry blended mixture formed into B) to form an article.

The concentrates of this invention are useful with a wide range of polyesters such as polyesters derived from glycols containing about 2 to about 10 carbon atoms and dibasic acids containing about 6 to about 40 carbon atoms. Preferred polyesters include those derived from terephthalic acid, isophthalic acid, naphthalenedicarboxylic acid, cyclohexanedicarboxylic and the like or their alkyl esters. Preferred glycols include ethylene glycol, 1,4-butanediol, 1,4-cyclohexanedimethanol and the like. The polyesters may be homopolymers or copolymers containing up to about 50 mol % of other dibasic acids or glycols. Also, blends of polyesters may be used. Modifying dibasic acids (in addition to those named above) include oxalic, succinic, glutaric, adipic, sebacic, suberic, dimer, sulfoisophthalic, or its metal salts, and the like. When naphthalenedicarboxylic acid is used, it may be any of the various isomers but the preferred ones include the 2,6-, 2,7-, 1,5-, and 1,6-isomers. Mixtures of the various isomers may also be used. When cyclohexanedicarboxylic acid is used, it may be the 3-, or 1,4-isomers, and may be cis-, trans-, or a mixture of cis/trans isomers. Modifying glycols (in addition to those named above) include 1,6-hexanediol, neopentyl glycol, 2,2,4,4-tetramethyl-1,3-cyclobutanediol and the like. When cyclohexanedimethanol is used, it may be the 1,3- or 1,4-isomers and may be cis-, trans-, or a mixture of cis/trans isomers. These polyesters are readily made by conventional melt phase or solid state polycondensation techniques well known in the art. These polymers will generally have inherent viscosity (I.V.) values in the range of about 0.4 to about 1.1 and may be crystallizable or amorphous.

Polyolefins useful in preparing concentrates containing the branching agents include linear low density polyethylene, conventional low density polyethylene, high density polyethylene, ethylene copolymers with α-olefins containing 2 to about 10 carbon atoms, polypropylene, propylene copolymers with α-olefins containing 2 to about 10 carbon atoms, poly-1-butene, 1-butene copolymers with α-olefins containing 2 to about 10 carbon atoms, poly-4-methyl-1-pentene, 4-methyl-1-pentene copolymers with α-olefins containing 2 to about 10 carbon atoms and the like. The ethylene polymers will have melt index values (measured by ASTM Method No. D1238-56T) of about 0 to about 100 at 190° C. with preferred melt index values of about 0.1 to about 20. Propylene and 1-butene polymers will have melt flow rate values (measured by ASTM Method No. D1238-56T) of about 0 to about 100 at 230° C. with preferred melt flow rates of about 0.1 to about 20 at 230° C. These olefin polymers are readily prepared by conventional methods and many of them are commercially available.

The branching agent preferably has a molecular weight of about 50–5000, more preferably, 92–3000 and a functionality of about 3–6. The branching agent may be a polyol having 3–6 hydroxyl groups, a polycarboxylic acid having 3 or 4 carboxyl groups or a hydroxy acid having a total of 3–6 hydroxyl and carboxyl groups.

Representative polyols that function as branching agents include glycerol, trimethylolpropane, pentaerythritol, 1,2,6-hexanetriol, sorbitol, 1,1,4,4-tetrakis(hydroxymethyl) cyclohexane, tris(2-hydroxyethyl)isocyanurate, and dipentaerythritol. In addition to those low molecular weight polyols, higher molecular weight polyols (MW 400–3000), particularly triols derived by condensing alkylene oxides having 2–3 carbons, e.g., ethylene oxide, propylene oxide with polyol initiators, which have 3–6 carbons, e.g., glycerol, can also be used as branching agents.

Representative polycarboxylic acids that can be used as branching agents include hemimellitic or trimellitic acid, trimesic acid, pyromellitic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Although the acids may be used as such, preferably they are used in the form of their lower alkyl esters or (most preferably) as their cyclic anhydrides in those instances were cyclic anhydrides can be formed.

Representative hydroxy acids that can be used as branching agents include malic acid, citric acid, tartaric acid, 3-hydroxyglutaric acid, mucic acid, trihydroxyglutaric acid, and 4-(beta-hydroxyethyl)phthalic acid. Such hydroxy acids contain a combination of 3 or more hydroxyl and carboxyl groups.

Especially preferred branching agents include trimellitic anhydride, trimesic acid, oxypropylated triols (optionally capped with ethylene oxide) having molecular weight of 400–3000 and tris(2-hydroxyethyl)isocyanurate.

An antioxidant may be added to the composition in an amount of up to 2 percent by weight of the polyester. Generally, the amount of antioxidant that is added to and incorporated in the polyester is from about 0.1–1% by weight of the polyester. The antioxidants can be added with the monomers prior to the formation of the polyester polymer or, if desired, they can be added to the molten polymer after polymerization has been completed. Preferably, the antioxidant is added with the monomers before polymerization is initiated.

Properties of these polyester compositions can also be modified by incorporation of various conventional organic fillers, such as carbon black, silica gel, alumina, clays and chopped fiber glass. Improvement in light stability is possible by the addition of small amounts of pigments or the incorporation of a light stabilizer, such as ultraviolet light absorbers. Flame retardants, lubricants and extenders can also be added to the compositions.

The concentrate is prepared by melt blending the polyolefin and branching agent by well known means until a homogeneous blend is obtained. Other conventional additives can be melt blended at this time. The concentrates are readily prepared by melt mixing the polyolefin and the branching agent in an extruder, Banbury mixer or other conventional melt mixing device and the master batch is then extruded and pelletized. The concentration of the branching agent is generally in the range of about 1 to about 50 weight % based on the weight of the concentrate but the preferred range is about 5 to about 20%. In addition to the branching agent, other components such as nucleating agents, colorants, pigments, fillers, antioxidants and the like may also be incorporated in the polyolefin master batch.

When the concentrates are mixed with polyesters in the melt at elevated temperatures, the resulting branched polyesters are useful in a variety of end uses including the manufacture of films, tubes, foams, blow molded objects, extrusion coated materials, food packaging containers, injection molded parts and the like. The blend is dried in conventional or vacuum ovens and extruded or molded by conventional techniques.

Although the concentrate and method according to the present invention can be used in many molding or extrusion applications, i.e., such as injection molding, injection blow molding, extrusion, extrusion blow molding, etc., to form non-foamed products, a preferred product is a foamed article. Foaming polymers is a process well known in the art.

Extrusion techniques common to those skilled in the art can be used to foam the polyester and concentrate of the present invention, preferably to densities less than 1.1 g/cc more preferably, densities of less than about 0.9 g/cc are achieved.

In a typical foam extrusion process, the basic apparatus comprises a single extruder (preferably a length to diameter ratio of at least about 30:1), a liquid injection pump or gas cylinder with injector valves, a die to form the desired object, a cooling devise and a devise to collect the expanded, extruded product.

In such a process a two-stage screw is typically used but is not critically necessary. The polyester and concentrate are preferably added to the extruder feed hopper and fed to the feed section of the screw. The polyester and concentrate are melted in the transition section of the screw and the blowing agent added either in the transition section of the screw or near the beginning of the metering section.

Suitable blowing agents for the present invention include inert gases, such as nitrogen and carbon dioxide, hydrocarbons boiling about −40° C. to about 45° C., such as propane, butane and pentane; hydrofluorcarbons and hydrochlorofluorocarbons; and gas liberating chemical blowing agents, such as sodium bicarbonate, a combination of citric acid and sodium bicarbonate, a combination of citric acid and sodium carbonate, azodicarbonamid and various endothermic blowing agents which release $CO_2$. Mixtures of blowing agents can also be used. Blowing agents are used in amounts of about 0.1 to about 20% (by weight based upon the weight of the polyester and blowing agent) to obtain the desired high expansion ratios. Concentrations of about 0.1 to about 5 percent are typical.

The resin melt containing dissolved and/or dispersed blowing agent is metered by the screw to the die. Upon exiting the die, the melt is expanded, optionally shaped, cooled and collected. The temperature profile on the extruder and die is adjusted to melt the polyester in the extruder prior to the injection of the blowing agent and adequately cool the melt/blowing agent composition to allow for expansion without coalescence.

Another typical foam extrusion process employs two tandem extruders. In this process the polyester is mixed, melted and the blowing agent injected in the first extruder. The melt/blowing agent composition is transferred by means of a conventional transfer tube to the feed section of the second extruder which is used to transfer the melt blend to the die and to bring the melt temperature and pressure in the die to the values necessary for optimum foam formation. Typically the two extruders are of different sizes. The tandem extruder process allows for excellent control of process variables.

As is apparent to those of ordinary skill in the art, various screw configurations and designs typical for this application can be used to prepare foamed polyesters. Mixers can be added to the screw or as independent components to disperse additives, nucleation agents, and blowing agents. Twin screw extruders can be used.

The following examples are submitted for a better understanding of the invention:

EXAMPLE 1

Preparation of Concentrate Based on Linear Low Density Polyethylene

A physical blend is prepared using 15.66 lb of linear low density polyethylene (melt index 0.9; density 0.919), 2.0 lb of pyromellitic dianhydride branching agent, 2.0 lb of sodium carbonate, 0.34 lb talc, and 0.1 lb of Ethanox 330 antioxidant. The blend is tumbled in a stainless steel vessel and purged with nitrogen to exclude air. The blend is then melt blended at 400° F. (204° C.) in a Werner and Pfleiderer extruder using mixing type 30 mm twin screws. The extrudate in the shape of a rod (2–3 mm in diameter) is quenched in a cold water trough, chopped into pellets, and then the pellets are air dried. The sodium carbonate and talc are present to act as foam nucleating agents.

EXAMPLE 2

Preparation of Concentrate Based on Linear Low Density Polyethylene

The procedure of Example 1 is repeated using 17.66 lb of linear low density polyethylene (melt index 0.9; density 0.919), 2.0 lb of pyromellitic dianhydride, 0.34 lb of $TiO_2$ nucleating agent and 0.05 lb of Ethanox 330 antioxidant.

EXAMPLE 3

Preparation of Concentrate Based on Linear Low Density Polyethylene

The procedure of Example 1 is repeated using 15.66 lb of linear low density polyethylene (melt index 0.9; density 0.919), 2.0 lb of pyromellitic dianhydride, 2.0 lb of sodium carbonate, 0.34 lb of $TiO_2$, and 0.02 lb of Ethanox 330 antioxidant.

EXAMPLE 4

Preparation of Concentrate Based on Conventional Low Density Polyethylene

The procedure of Example 1 is repeated using 17.66 lb of conventional low density polyethylene (melt index 4.0; density 0.917), 2.0 lb of pyromellitic acid, 0.34 lb of $TiO_2$ and 0.02 lb of Irganox 1076 antioxidant.

EXAMPLE 5

Preparation of Concentrate Based on High Density Polyethylene

The procedure of Example 1 is repeated using 16.62 lb of high density polyethylene (melt index 0.1; density 0.965), 3.0 lb of trimellitic anhydride branching agent, 0.34 lb of china talc nucleating agent, and 0.04 lb of Irganox 1010 antioxidant.

EXAMPLE 6

Preparation of Concentrate Based on Polypropylene

The procedure of Example 1 is repeated using 17.66 lb of polypropylene (melt flow rate 1.2), 3.0 lb of pyromellitic dianhydride branching agent, 0.34 lb of $TiO_2$ nucleating agent, 0.04 lb of dilauryl thiodipropionate and 0.02 lb of Irganox 1010. The latter two compounds are present as heat stabilizers and antioxidants.

EXAMPLE 7

Preparation of Concentrate Based on a Propylene Copolymer

The procedure of Example 1 is repeated using 17.66 lb of propylene copolymer containing 3 mol % ethylene (melt flow rate 0.5), 2.0 lb of pentaerythritol branching agent, 0.34 lb of $TiO_2$, 0.04 lb of dilauryl thiodipropionate, 0.02 lb of Irganox 1010, and 0.02 lb of Weston 619 stabilizer.

EXAMPLE 8

Preparation of Concentrate Based on a Propylene Copolymer

The procedure of Example 1 is repeated using 17.66 lbs. of propylene copolymer containing 5 mol % 1-butone (melt flow rate 3.5), 3.0 lbs. of pyromellitic dianhydride, 0.34 lbs. of $TiO_2$, 0.04 lbs. of dilauryl thiodipropionate, and 0.02 lbs. of Irganox 1010.

EXAMPLE 9

Foaming of Poly(ethylene terephthalate) (PET)

Dried pellets of poly(ethylene terephthalate) (I.V 0.90) and dried pellets of the linear low density polyethylene concentrate from Example 1 are thoroughly mixed in a 20:1 ratio (wt/wt) in a stainless steel vessel and the blend is fed manually into a tandem extruder consisting of a 2-inch primary extruder capable of injecting a gaseous blowing agent under high pressure into the polymeric melt and a 2.5-inch secondary extruder which allows the melt to foam under reduced pressure and then extrudes it through an annular die (3-inch diameter) located at the end of the second extruder. The two extruders are connected through a well-known low pressure crossover zone. The gaseous blowing agent used in this example is isopentane. The extruders, the crossover zone, and the annular die are heated at 500°–525° F. (260°–274° C.) through their entire length as noted below:

2-inch primary extruder=500° F. (260° C.)
Crossover Zone=500° F. (260° C.)
2.5-inch secondary extruder=500° F. (260° C.)
Annular 3-inch die=525° F. (274° C.)

Other relevant extrusion conditions and parameters are as follows:

| Pressures (psi) | |
| --- | --- |
| 2-inch extruder | 5600–6000 |
| Crossover Zone | 3740–3860 |
| 2.5-inch extruder | 2210–2230 |
| Isopentane injection | 3250–5600 |
| Extrusion Rates | |
| 2-inch extruder | 87 rpm |
| 2.5-inch extruder | 16.4 rpm |
| Polymer output | 66 lb/hr |
| Isopentane injected | 1.6 lb/hr |

Under these conditions, the PET concentrate mixture described above extrudes with the desired characteristics needed to produce good foam. The foam coming from the annular die has a dry hand and good melt strength so that it can be readily stretched over a water cooled mandrel. The foam is slit and collected as a sheet 36 inches wide. The thickness and density of the foam respond well to changes in the line-speed and isopentane level. The foam produced has a density of 0.19 g/cc at a thickness of 56 mils. It has an I.V. of 0.79 and a GPC weight average molecular weight of 71898 and a Mz/Mn ratio of 8.94. It also has a crystallinity of 14.78% as measured by DSC. Scanning Electron Microscopy and Confocal Light Microscopy show the cell structure to be well formed with all cells being closed and of 100–200 μm diameter in size. The foam shows good post-expansion properties as described below.

Post Expansion:

(a) A small piece of the foam produced above is immersed in boiling water for 2 minutes and then cooled to room temperature. Its thickness is measured using a FOWLER micrometer at several points along the foam surface and the average thickness is 89 mils, which is a 59% increase from the as-produced foam. The density of this post-expanded foam is measured to be 0.096 g/cc. It has a crystallinity of 31.21% as measured by DSC. Scanning Electron Microscopy and Confocal Light Microscopy show the cell structure to be well formed with all cells being closed and of 200–400 μm diameter in size.

(b) A small piece of the foam is also post-expanded in a conventional air-oven at 175° C. for 3 minutes. This foam has an average thickness of 73 mils, and a density of 0.135 g/cc. It has a crystallinity of 31.74% as measured by DSC. Scanning Electron Microscopy and Confocal Light Microscopy show the cell structure to be well formed with all cells being closed and of 200–300 μm diameter in size.

Similarly good foaming results are achieved using PET/concentrate blends which are mixed at ratios of 25:1 and 15:1.

Similarly good results are also obtained when nitrogen or carbon dioxide gas is used instead of the isopentane as the blowing agent.

Similarly good foaming results are achieved when the polyester/master batch is dusted with 2 wt % of the chemical blowing agent azodicarbonamide prior to the extrusion process instead of using the isopentane blowing agent.

Similarly good foaming results are also achieved when a combination of a chemical blowing agent and a gas blowing agent is used. Thus, the polyester/master batch blend is dusted with 0.5 wt % of the chemical blowing agent azodicarbonamide prior to the extrusion process, and then the isopentane blowing agent is used during the extrusion process as described above.

EXAMPLE 10

Foaming of Branched Poly(ethylene terephthalate) Polymer

The procedure of Example 9 is repeated using a 20:1 blend of a branched poly(ethylene terephthalate) copolyester containing 0.3 mol % trimellitic anhydride (I.V. 0.68) and the concentrate of Example 2. The foam produced has a dry hand and good cell structure.

Similarly good results are achieved when poly(ethylene terephthalate) copolyester containing 0.2 mol % of either trimellitic acid or pyromellitic dianhydride is foamed using the master batch of Example 2.

EXAMPLE 11

Foaming of a Polyethylene terephthalate) Copolyester

The procedure of Example 9 is repeated using a 20:1 blend of a poly(ethylene terephthalate) copolyester containing 3.5 mol % of 1,4-cyclohexanedimethanol (I.V. 0.80) and the concentrate of Example 3. The foam produced has a dry hand and good, uniform cell structure.

Similarly good results are achieved when the concentrates of Examples 4, 5, and 6 are used instead of the master batch from Example 3.

EXAMPLE 12

Foaming of Poly(1,4-cyclohexylenedimethylene terephthalate)

The procedure of Example 9 is repeated using a 20:1 blend of poly(1,4-cyclohexylenedimethylene terephthalate) (I.V. 0.77) and the concentrate of Example 7. The foam produced has a dry hand and a good, uniform cell structure.

Similarly good results are achieved when the concentrates of Example 1 and Example 8 are used instead of the concentrate of Example 7.

EXAMPLE 13

Foaming of a Polyethylene terephthalate) Copolyester

The procedure of Example 9 is repeated using a 20:1 blend of a poly(ethylene terephthalate) copolyester containing 31 mol % 1,4-cyclohexanedimethanol (I.V. 0.75) and the concentrate of Example 1. The foam produced has a dry hand and good, uniform cell structure.

Similarly good results are achieved using poly(ethylene terephthalate) copolyesters containing 17 mol % diethylene glycol (I.V. 0.74) or 37 mol % diethylene glycol (I.V. 0.74).

EXAMPLE 14

Foaming of a Poly(1,4-Cyclohexylenedimethylene terephthalate) Copolyester

The procedure of Example 9 is repeated using a 20:1 blend of a poly(1,4-cyclohexylenedimethylene terephthalate) copolyester containing 34 mol % ethylene glycol (I.V. 0.75) and the concentrate of Example 1. The foam produced has a dry hand and good, uniform cell structure.

Similarly good results are achieved when poly(1,4-cyclohexylenedimethylene terephthalate) copolymers containing 5 mol % isophthalic acid (I.V. 0.95), 17 mol % isophthalic acid (I.V. 0.77) or 10 mol % 2,6-naphthalenedicarboxylic acid (I.V. 0.72) are used.

EXAMPLE 15

Foaming of Poly(ethylene 2,6-naphthalenedicarboxylate)

The procedure of Example 9 is repeated using a 20:1 blend of poly(ethylene 2,6-naphthalenedicarboxylate) (I.V. 0.70) and the concentrate of Example 1. The foam produced has a dry hand and good, uniform cell structure.

Similarly good foaming results are achieved when the polyester/master batch blend is dusted with 2 wt. % of the chemical blowing agent azodicarbonamide prior to the extrusion process instead of using the isopentane blowing agent.

The foamed compositions described in the above examples have improved melt viscosity. For example, a 0.9 I.V. PET has a melt viscosity of about 19,000 poise at 280° C. When branched with 0.6% pyromellitic dianhydride from the concentrate, the melt viscosity is about 117,000 poise at 280° C.

Inherent viscosity is measured in a 60/40 solution of phenol/tetrachloroethane at a concentration of 0.5 gram polymer per 100 ml, at 25° C.

Molecular weight is measured by gel permeation chromatography (GPC).

The invention has been described in detail with particular reference to preferred embodiments thereof, but it will be understood that variations and modifications can be effected within the spirit and scope of the invention.

We claim:

1. A polyester foam composition comprising a mixture of Components (A) and (B),
    wherein Component (A) is prepared prior to mixing with Component (B) by the melt blending of:
    1) about 50 to about 99 weight % of a polyolefin selected from (1) ethylene homopolymers and copolymers of ethylene with α-olefins having 2 to 10 carbon atoms having a melt index of about 0 to about 100 at 190° C. and (2) propylene homopolymers, 1-butene homopolymers and copolymers consisting of propylene and/or 1-butene having a melt flow rate of about 0 to about 100 at 230° C.; and
    2) about 1 to about 50 weight % of one or more polyfunctional carboxylic acid, anhydride or polyol branching agents selected from the group consisting of trimesic acid, pyromellitic acid, pyromellitic dianhydride, trimellitic anhydride, 1,2,3,4-benzenetetracarboxylic acid, glycerins, trimethlolpropane and pentaerythritol;
    wherein Component (B) comprises one or more polyesters comprising repeat units from an aromatic, aliphatic or cycloaliphatic dicarboxylic acid having 6–40 carbon atoms, and an aliphatic or cycloaliphatic glycol having 2–10 carbon atoms, and
    wherein said polyester composition comprises from 1000:1 to 4:1 ratio by weight of Component (B) to Component (A).

2. The polyester composition of claim 1 comprising from 25:1 to 15:1 ratio of Component (B) to Component (A).

3. The polyester composition of claim 2 comprising from 20:1 ratio of Component (B) to Component (A).

4. The polyester composition of claim 1 wherein said dicarboxylic acid is selected from the group consisting of terephthalic acid, isophthalic acid, naphthalenedicarboxylic acid, cyclohexanedicarboxylic acid or esters thereof.

5. The polyester composition of claim 1 wherein said glycol is selected from the group consisting of ethylene glycol, 1,4-butanediol, and 1,4-cyclohexanedimethanol.

6. The polyester composition of claim 1 wherein one of said one or more polyesters is poly(ethylene terephthalate).

7. The polyester composition of claim 1 wherein one of said one or more polyesters is poly(1,4-cyclohexylenedimethylene terephthalate) copolyester.

8. The polyester composition of claim 1 wherein one of said one or more polyesters is poly(ethylene-2,6-naphthalenedicarboxylate) copolyester.

9. The polyester composition of claim 1 wherein said Component (A) is present in an amount of about 0.1 to 20 weight % and Component (B) is present in an amount of about 80 to 99.9 weight %, based on the sum of the weight percentages of Components (A) and (B) equalling 100 weight %.

10. The polyester composition according to claim 1 wherein said polyolefin is a polyethylene homopolymer or a copolymer of ethylene with α-olefins having 2 to 10 carbon atoms.

11. The polyester composition of claim 1 wherein said component (A) additionally comprises one or more of an additive selected from the group consisting of: talc, china talc, sodium carbonate, titanium dioxide, 1,3,5-trimethyl-2,4,6-tris(3,5-di-t-butyl-4-hydroxybenzyl)benzene, pentaerythritol tetrakis(3,5-di-t-butyl-4-hydroxy hydrocinnamate), octadecyl(3,5-di-t-butyl-4-hydroxy hydrocinnamate), and dilauryl thiodipropionate.

12. A polyester composition of claim 1 wherein the said component (B) additionally comprises one or more of an additive selected from the group consisting: antioxidants, carbon black, silica gel, alumina, clays, chopped glass fiber, pigments, ultraviolet light absorbers, flame retardants, lubricants and extenders.

13. The polyester composition of claim 1 wherein said polyester has a density of 0.19 to 1.1.

14. The polyester composition of claim 1 wherein said polyester has a density of 0.19 to 0.9.

15. The polyester composition of claim 1 wherein said polyester has an I.V. of 0.4 to 1.1.

* * * * *